Feb. 17, 1959     D. T. SETTLES     2,873,934

ADJUSTABLE MERCHANDISE SKID

Filed Nov. 22, 1955

INVENTOR.
D. T. Settles
BY Arthur H. Sturges
Attorney

2,873,934
Patented Feb. 17, 1959

2,873,934
ADJUSTABLE MERCHANDISE SKID

Dean T. Settles, North Bend, Nebr., assignor to Weldon Industries, Inc., Hoosick Falls, N. Y., a corporation of New York Application November 22, 1955, Serial No. 548,352

1 Claim. (Cl. 248—120)

This invention relates to material handling equipment such as used in warehouses, and on docks and the like for transporting merchandise, and other cargo and the like from one location to another, and in particular a skid formed of tubular material and being extensible both longitudinally and laterally and having material retaining elements extended upwardly therefrom and legs extended downwardly from lower surfaces of the parts to support the tubular elements in spaced relation to the floor so that an area is provided to receive the fork of a lift truck or tractor to facilitate transporting the skid with merchandise thereon.

The purpose of this invention is to provide a cargo skid that is readily adjustable to merchandise of different sizes.

Merchandise skids are used for transporting materials from one position to another, and they are particularly useful because forks of tractors may be inserted between the platforms thereof and the floor and the entire skid with merchandise thereon picked up and carried as a unit. However, skids of this type are made of heavy timbers and the timbers are cut and fitted to a certain size, and in numerous instances the size of the skid limits the merchandise to be carried thereon. The conventional skids are built to a predetermined size, and as the skids are solid the size is not adjustable.

With this thought in mind this invention contemplates a skid formed of telescoping tubular members with side and end members connected with intermediate members, whereby the skid is adapted to be extended both longitudinally and laterally, and in which material retaining elements extend upwardly from the tubular members and supporting legs extend downwardly therefrom.

The object of this invention is, therefore, to provide a merchandise handling skid that is extensible.

Another object of the invention is to provide a merchandise handling skid that is made of metal wherein the life thereof is indefinite.

Another important object of the invention is to provide means for mounting telescoping tubular elements in combination with telescoping side and end rails to form a skid in which one or both of the side rails, or one or both the end rails may be extended, as may be desired, to correspond with merchandise to be carried thereon.

A further object of the invention is to provide an extensible skid that is adapted to be adjusted to compensate for varying types of merchandise and cargo, in which the lower surface of the skid is spaced above a supporting surface so that a fork of a tractor or the like may be placed under the platform of the skid to facilitate picking up cargo and the like.

A still further object is to provide a skid for merchandise, cargo, and the like in which the skid is adapted to be extended at the sides and ends in which the skid is of a simple and economical construction.

With these and other objects and advantages in view the invention embodies a platform including telescoping tubular side rails connected at the ends with telescoping tubular end rails and at points intermediate of the ends also with telescoping tubular rails, with merchandise retaining bars extended upwardly from the rails and supporting legs extended downwardly therefrom.

Other features and advantages of the invention will appear from the following description taken in connection with the drawings, wherein.

Figure 1:
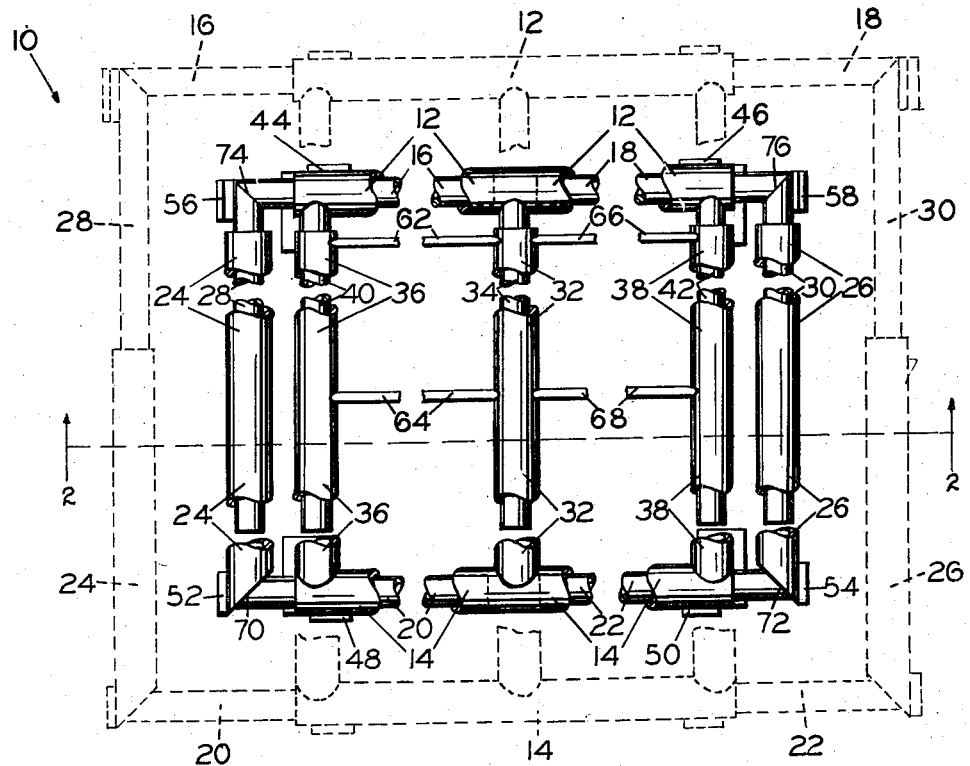
Figure 1 is a plan view of the platform of the skid with parts of the rails broken away showing the skid in the retracted position in full ines and in the extended position in broken lines.
Figure 2:
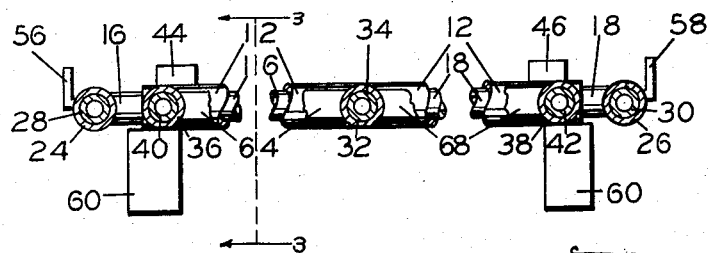
Figure 2 is a longitudinal section through the skid taken on line 2—2 of Figure 1.
Figure 3:
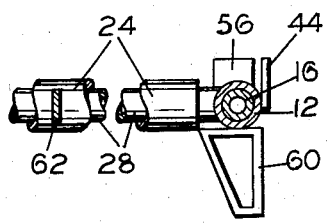
Figure 3 is a cross section through the side rail at one side of the skid taken on line 3—3 of Figure 2.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claim. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numerals 12 and 14 parallel first and second tubular side rails, respectively with tubular telescoping sections 16 and 18 slidably mounted in the side rail 12, and similar telescoping sections 20 and 22 similarly mounted in the side rail 14, numerals 24 and 26 outer end rails having inner tubes 28 and 30, respectively, slidably mounted therein, a tubular intermediate rail 32 having an inner tube 34 slidably mounted therein, inner end rails 36 and 38 with inner telescoping tubes 40 and 42 slidably mounted therein, numerals 44 and 46 merchandise retaining bars extended upwardly from the rail 12, numerals 48 and 50 bars extended upwardly from the rail 14, numerals 52 and 54 bars extended upwardly from the end rails 24 and 26, respectively, numerals 56 and 58 bars extended upwardly from the sections 28 and 30, and numeral 60 supporting legs extended downwardly from the rails.

The inner end rail 36 is connected to the intermediate rail 32 with braces 62 and 64 and the intermediate rail is connected to the inner end rail 38 with similar braces 66 and 68. By this means the intermediate part of the frame or platform is rigidly supported, and with the telescoping elements assembled as shown and described one side may be extended, or both sides may be extended without extending the ends, or one or both of the ends may be extended, as may be desired.

The outer end rails 24 and 26 are provided with beveled ends 70 and 72 by which the rails are secured, such as by welding, to extended ends of the smaller inner sections 20 and 22 of the side rail 14, and beveled ends 74 and 76 of the inner sections 16 and 18 of the side rail 12, are also secured, such as by welding, to beveled ends of the inner end rails 28 and 30. The merchandise retaining bars and also the legs 60 are also secured to the rails by welding or the like.

Operation

The skids are provided, shipped and stored in the condensed or retracted position, as shown by the full lines in Figure 1, and when it is desired to place merchandise, cargo, or the like on the skid, the parts are drawn outwardly to correspond with the shape and size of the merchandise, and by this means a skid is provided that is readily adjustable to the size of merchandise to be carried or stored thereon. The tubes are made of relatively light weight material so that very little weight is added to the cargo.

With the platform of the skid spaced above the floor by the legs 60 the fork of a tractor or the like may readily be inserted in the area between the skid and the floor so that the skid with merchandise thereon may readily be picked up and transported from place to place.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market. It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to in actual practice, if desired.

Having now described the invention that which is claimed to be new and desired to be procured by Letters Patent, is:

In an adjustable merchandise skid, the combination which comprises spaced tubular parallel first and second side rails, tubular inner end rails integral with and extended from the ends of said second side rail, a tubular intermediate rail integral with and extended from said second side rail, the intermediate rail being parallel to the end rails and the intermediate and end rails being extended toward the first side rail and to points spaced from the first side rail, longitudinally disposed bars integral with and extended between the end and intermediate rails providing braces, telescoping tubes integral with and extended from the first side rail, said telescoping tubes being slidable in the end and intermediate rails, telescoping tubes slidably mounted in and extended from end portions of the first and second side rails, outer end rails integral with and extended from ends of the telescoping tubes extended from the second side rail, the outer end rails being parallel to the inner end rails and also extended to points spaced from the telescoping tubes extended from the first side rail, telescoping outer end tubes extended from ends of the telescoping tubes extended from ends of the first side rail and slidably mounted in the outer end rails, supporting legs depending from the ends of the first and second side rails, and merchandize retaining bars extended upwardly from the first and second side rails and outer end rails and tubes.

References Cited in the file of this patent

UNITED STATES PATENTS

| | | |
|---|---|---|
| 2,536,268 | Dillon | Jan. 2, 1951 |
| 2,664,307 | Wieland | Dec. 29, 1953 |
| 2,739,776 | Terando | Mar. 27, 1956 |